United States Patent [19]

Robbiati

[11] 3,769,138

[45] Oct. 30, 1973

[54] APPARATUS AND A METHOD FOR PREPARING A COMPOSITE LAMINATED SHEET

[76] Inventor: Dante Robbiati, Via Dante 6, Bernareggio, Italy

[22] Filed: Dec. 12, 1968

[21] Appl. No.: 783,198

Related U.S. Application Data

[63] Continuation-in-part of Ser. No. 446,186, April 7, 1965.

[30] Foreign Application Priority Data

Dec. 14, 1964 Italy .................................... 54,372

[52] U.S. Cl. ................. 156/310, 156/320, 156/322, 156/333
[51] Int. Cl. ............................................. B32b 7/00
[58] Field of Search .................... 156/320, 311, 312, 156/310, 333, 322, 250; 117/217, 218

[56] References Cited
UNITED STATES PATENTS

| | | | |
|---|---|---|---|
| 3,125,480 | 3/1964 | Karo et al. ........................... | 156/310 |
| 3,179,143 | 4/1965 | Schultz et al. ................... | 156/310 X |
| 3,180,777 | 4/1965 | Karo ................................... | 156/310 |

Primary Examiner—Benjamin R. Padgett
Assistant Examiner—Stephen J. Lechert, Jr.
Attorney—Arthur O. Klein

[57] ABSTRACT

A method for continuously producing a laminated composite sheet comprising at least two metal layers; the method comprising the steps of coating a very thin foil of a valuable metal with an adhesive medium and joining it under pressure to the face of a thicker metal sheet which has been prior to said joining, covered with a layer of thermoplastic material.

4 Claims, 2 Drawing Figures

INVENTOR:
Dante ROBBIATI

BY: Arthur O. Klein
ATTORNEY

APPARATUS AND A METHOD FOR PREPARING A COMPOSITE LAMINATED SHEET

This application is a continuation-in-part of copending application Ser. No. 446,186, filed Apr. 7, 1965.

It is an object of the present invention to provide an apparatus and a method for continuously preparing a composite laminated sheet comprising two metal strips having interposed therebetween an intermediate thermoplastic layer; and a further object is the sheet thus obtained.

More particularly, it is an object of this invention to provide a laminated sheet in which a very thin strip of a more valuable metal (such as stainless steel, nickel silver, copper, bronze, or brass) is coupled to a galvanized iron or aluminium back plate, a thermoplastic material layer being interposed between the two strips.

Figure 2:
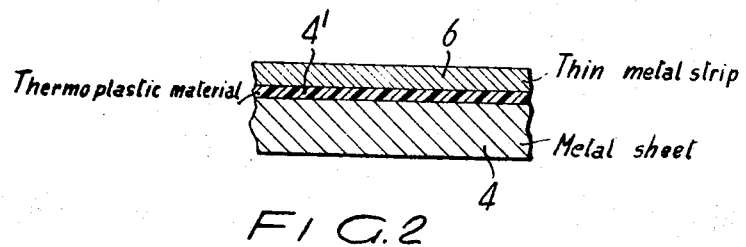
Figure 1:
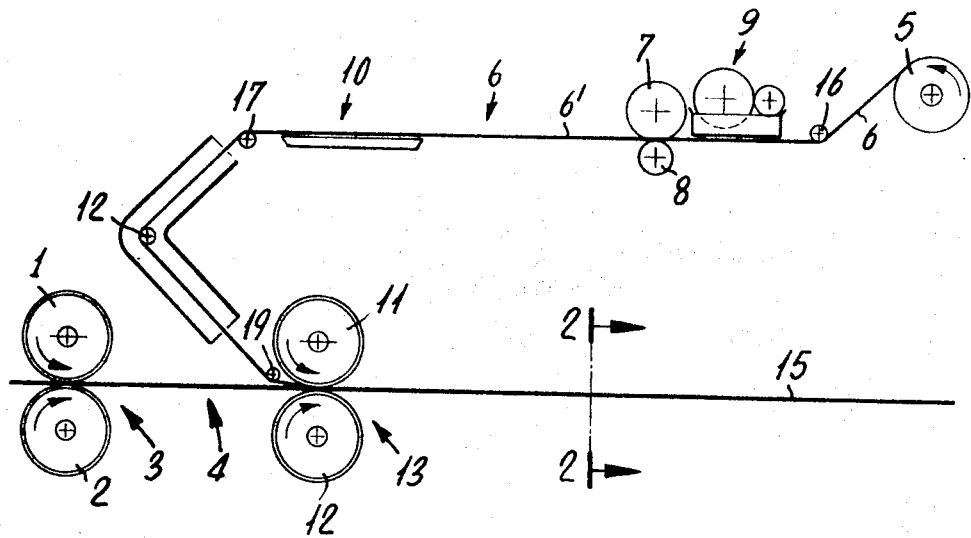

In order that the invention may be clearly understood and readily carried into effect, the same will now be described with reference to and by aid of the accompanying drawing in which FIG. 1 illustrates diagrammatically an apparatus for carrying the method of this invention;

FIG. 2 is a diagrammatic sectional view along line 2—2 of FIG. 1, illustrating in cross-section the composite laminated sheet forming part of this invention.

Such an apparatus includes, in combination, two calenders indicated with reference numerals 3 and 13 respectively, a supply reel 5, a gluing device 9, two furnaces indicated with reference numerals 10 and 14 respectively, as well as several idle rollers indicated with reference 16, 17, 18 and 19. The rotational directions of the various rollers are indicated by arrows in FIG. 1.

The above mentioned apparatus and its operation will be more particularly illustrated in the following method description.

Referring to FIG.1, a continuous metal sheet 4 is shown being advanced between rollers 1 and 2 of calender 3, said sheet 4 being, for example, a galvanized iron or aluminium plate, which has been plasticized according to known methods and having therefore a layer 4' of thermoplastic material containing, for example, plasticized polyvinyl (100/40) on its upper face.

A thin strip 6, such as a stainless steel or nickel silver or bronze or copper or brass strip, is unrolled from reel 5 onto which said strip is wound, and is passed beneath roller 16 and then between rollers 7 and 8 of a known type which form part of the device 9, which deposits an adhesive layer of a uniform thickness on the upper face 6' thereof. Illustrative material for a suitable adhesive layer is polyvinyl chloride-acetate copolymer dissolved in a suitable solvent, such as ketone and more precisely methylethylketone.

Strip 6 is then passed through a perferably electric furnace 10. This furnace heats the strip 6 to a temperature of 70°–90° C in order to allow evaporation of the solvent contained in the adhesive, and, by means of idle rollers 17 and 18, is subsequently passed through a perferably gas heated furnace 14 wherein the strip is subjected to a further heat treatment in a temperature range of 140°–170° C in order to regenerate dried adhesive residual.

On exiting from said furnace 14, strip 6 passes beneath idle roller 19, where it meets with strip 4 and more particularly with the face of the latter, which is covered with a thermoplastic material layer 4', as stated above.

The two strips 6 and 4, with the interposed thermoplastic material layer 4', are coupled by a calender 13, between the rollers 11 and 12 of which they pass.

Thus, by means of the above described apparatus and method, provision is made for a composite laminated sheet being formed of: a lower strip formed of a galvanized iron or aluminium laminated sheet, an intermediate thermoplastic material layer and, finally, an upper strip formed of very thin laminated layer consisting of stainless steel or nickel silver or bronze or copper or brass or another valuable metal.

The laminated sheet, obtained by means of the above described apparatus and method, also forms part of the present invention.

According to a modification of the described method, in lieu of using a strip having only one covered face, a strip having both faces covered with thermoplastic material can be used.

In addition to the above described installation, other installations can be formulated in order to improve the apparatus and method according to the invention, without departing from the protective field of the present invention.

What is claimed is:

1. A method for producing a continuous laminated composite sheet which has at least two metal layers, comprising the steps of coating with an adhesive medium a relatively very thin sheet of a metal selected from the group consisting of stainless steel, bronze, brass, copper and nickel silver;

covering a relatively thick sheet of metal selected from the group consisting of galvanized iron and aluminium with a layer of thermoplastic material of a first composition; and joining under pressure the side of said relatively very thin sheet of metal which is coated with said adhesive medium to the side of said relatively thick sheet of metal which is covered with a layer of thermoplastic material of a second composition.

2. The method as set forth in claim 1, wherein said adhesive medium consists of polyvinyl chloride-acetate copolymer dissolved in a solvent.

3. The method as set forth in claim 1, including the further steps of passing said coated relatively thin sheet of metal through a first furnace wherein said sheet is heated to a temperature ranging from 70° – 90° C and wherein said solvent is at least partially evaporated; and therafter, and prior to the joining under pressure step, passing said coated relatively thin sheet of metal through a second furnace wherein said sheet is heated to a temperature ranging from 140°–170° C and wherein said dried adhesive medium is regenerated.

4. The method as set forth in claim 1, wherein said layer of thermoplastic material contains plasticized polyvinyl.

* * * * *